(12) United States Patent
Biran (10) Patent No.: US 7,899,965 B2
(45) Date of Patent: Mar. 1, 2011

(54) MANAGING MESSAGE SIGNALED INTERRUPTS

(75) Inventor: Giora Biran, Zichron-Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 12/353,422

(22) Filed: Jan. 14, 2009

(65) Prior Publication Data

US 2010/0180060 A1 Jul. 15, 2010

(51) Int. Cl.
G06F 13/24 (2006.01)

(52) U.S. Cl. .................... 710/263; 719/318

(58) Field of Classification Search .......... 710/260, 710/262–264, 266, 268–269; 719/318–319
See application file for complete search history.

(56) References Cited

U.S. PATENT DOCUMENTS

| | | | |
|---|---|---|---|
| 6,192,442 B1 | 2/2001 | Haren et al. | |
| 6,629,129 B1 | 9/2003 | Bookspan et al. | |
| 6,941,398 B2 | 9/2005 | Lai et al. | |
| 7,398,343 B1 * | 7/2008 | Marmash et al. | 710/269 |
| 2006/0294277 A1 | 12/2006 | Tetrick | |
| 2007/0294738 A1 * | 12/2007 | Kuo et al. | 725/116 |
| 2008/0013386 A1 * | 1/2008 | Condorelli et al. | 365/189.07 |

* cited by examiner

*Primary Examiner*—Clifford H Knoll
(74) *Attorney, Agent, or Firm*—Suzanne Erez (57) ABSTRACT

Managing Message Signaled Interrupts (MSIs). For example, a method of managing MSI requests in a computing system may include receiving a plurality of MSI requests from one or more components of the computing system; directing data of the plurality of MSI requests to be stored sequentially, according to a First In First Out (FIFO) order, in successive entries of a FIFO structure defined in a main memory of the computing system; and directing a processor of the computing system to retrieve data of one or more of the plurality of MSI requests from the FIFO structure to be processed according to the FIFO order. Other embodiments are described and claimed.

20 Claims, 3 Drawing Sheets

MANAGING MESSAGE SIGNALED INTERRUPTS

FIELD OF THE INVENTION

Some embodiments relate to the field of managing signaled message interrupts.

BACKGROUND OF THE INVENTION

A computing device may include a Peripheral Component Interconnect (PCI) or a PCI express (PCIe), to connect between components of a motherboard, e.g., a host bridge and/or a Central Processing Unit (CPU), and one or more peripheral components of the device, e.g., a graphics card, a sound card, externally connected hardware, or the like. The PCI may transfer to the host bridge a Message Signaled Interrupt (MSI) request generated by a peripheral component. The MSI request includes a request to interrupt one or more ongoing operations of the CPU, in order to prioritize the execution of a sequence of operations related to the peripheral component. A MSI request may include a notification in the form of a write transaction that includes identification data of the message, e.g., a data field, an address field, and additional data defining the interrupt request. Based on the identification data, the host bridge receiving the MSI request may determine characteristics of the MSI request, for example, a source component and a type of the MSI request. The host bridge may send portions of the identification data to the CPU, which processes the interrupt request.

The host bridge may receive a large number of MSI requests from one or more peripheral components during a short period of time. Therefore, the host bridge may be incapable of managing all MSI requests and sending the requests to the CPU in a time-efficient manner, causing accumulation of data of un-processed requests in a memory of the host bridge.

Some computing devices store a certain number of MSI requests in the memory of the host bridge; however, this memory is generally limited and insufficient for storing a large number of MSI requests. In other computing devices, an incoming MSI request may be mapped to a value, stored in a-bit vector of pre-defined size. Based on the mapped value of the MSI request, an interrupt bit is sent to the CPU, for the CPU to manage the MSI request accordingly. This, however, may limit the managing of various types of MSI requests originating in a single peripheral component, since there exists only one value representing each specific peripheral component. In other computing devices, for example, an application associated with the CPU may define a FIFO structure of pre-set size in a memory of the host bridge, and may store data of each MSI request in an entry of the FIFO structure; however, this may cause a situation in which stored unprocessed MSI requests overflow.

SUMMARY

Some embodiments include, for example, devices, systems and methods of managing Message Signaled Interrupts (MSIs).

An embodiment may include, for example, a method of managing MSI requests in a computing system. The method may include receiving a plurality of MSI requests from one or more components of the computing system; directing data of the plurality of MSI requests to be stored sequentially, according to a First In First Out (FIFO) order, in successive entries of a FIFO structure defined in a main memory of the computing system; and directing a processor of the computing system to retrieve data of one or more of the plurality of MSI requests from the FIFO structure to be processed according to the FIFO order.

In some embodiments, the method may include defining the FIFO structure in the main memory by allocating one or more memory locations of the main memory to store one or more, respective, entries of the FIFO structure.

In some embodiments, the method may include directing substantially all the data of a data field of the plurality of MSI requests to be stored in respective entries of the FIFO structure.

In some embodiments, the method may include, upon receiving a new MSI request, determining whether or not all entries of the FIFO structure contain data of unprocessed MSI requests; and if all entries of the FIFO structure contain data of unprocessed MSI requests, directing data of the new MSI request to overwrite an entry of the FIFO structure that contains data of an oldest pending unprocessed MSI request.

In some embodiments, the method may include determining whether or not all entries of the FIFO structure contain data of unprocessed MSI requests; and if all entries of the FIFO structure contain data of unprocessed MSI requests, generating an error indication.

In some embodiments, directing data of the plurality of MSI requests may include pointing to a current write entry of the FIFO structure in which data of a current MSI request is to be stored according to the FIFO order.

In some embodiments, directing data of the plurality of MSI requests may further include updating the pointing to point to a next entry of the FIFO structure according to the FIFO order.

In some embodiments, directing the processor of the computing system may include pointing to a current read entry of the FIFO structure from which data is to be retrieved by the processor according to the FIFO order.

In some embodiments, directing the processor of the computing system may further include updating the pointing to point to a next entry of the FIFO structure according to the FIFO order.

Another embodiment includes, for example, an apparatus for managing MSI requests in a computing system. The apparatus may include a controller to direct data of a plurality of MSI requests received from one or more components of the computing system to be stored in successive entries of a FIFO structure defined in a main memory of the computing system.

In some embodiments, the controller may include a write register to point to successive entries of the FIFO structure in which data of the MSI requests is to be stored according to a FIFO order; and a read register to point to one or more of the successive entries of the FIFO structure from which one or more of the MSI requests, respectively, are to be retrieved for processing according to the FIFO order.

In some embodiments, the controller may include a base register to store data pointing to a memory location allocated to a base entry of the FIFO structure; and a size register to store data pointing to a memory location corresponding to a last entry of the FIFO structure.

In some embodiments, the controller is to update the write register to point to a next entry of the FIFO structure according to the FIFO order, after directing data of each of the MSI requests to be stored in the FIFO structure.

In some embodiments, the controller is to update the read register to point to a next entry of the FIFO structure, according to the FIFO order, after directing the processor to retrieve data of each of the MSI requests to be processed in the FIFO order.

In some embodiments, the apparatus may include an overrun register to determine whether or not all entries of the FIFO structure contain data of unprocessed MSI requests, by determining whether or not the write register and the read register point to a same entry of the FIFO structure.

In some embodiments, the controller is to generate an error indication if all entries of the FIFO structure contain data of unprocessed MSI requests.

In some embodiments, the write register is to point to an entry of FIFO structure that contains data of an oldest pending unprocessed MSI request, if all entries of the FIFO structure contain data of unprocessed MSI requests.

In some embodiments, the controller is to direct substantially all data of one or more data fields of the plurality of MSI requests to be stored in respective entries of the FIFO structure.

Another embodiment may include a computing system capable of managing MSI requests. The computing system may include a processor; a main memory; and a controller to direct data of a plurality of MSI requests received from one or more components of the computing system to be stored sequentially, according to a FIFO order, in successive entries of a FIFO structure defined in the main memory, and to direct the processor to retrieve one or more of the MSI requests stored in the FIFO structure for processing according to the FIFO order.

In some embodiments, the computing system may include a write register to point to a current write entry of the FIFO structure in which data of a current MSI of the plurality of MSI requests is to be stored according to the FIFO order; and a read register to point to a current read entry of the FIFO structure from which data of a pending MSI request is to be retrieved and processed by the processor according to the FIFO order.

In some embodiments, the controller of the computing system is to define a size of the FIFO structure to include a desired number of entries by allocating a suitable amount of memory in the main memory for storing the desired number of entries of the FIFO structure.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments may utilize wired communication and/or wireless communication.

As an overview, some embodiments provide devices, systems and/or methods of controlling Message Signaled Interrupt (MSI) requests, by storing and managing incoming MSI requests in a main memory of a computing system or a computing device, for example, a personal computer, wherein the storing is performed according to a First In First Out (FIFO) order.

Some embodiments, for example, may include a controller to receive and manage incoming MSI requests from peripheral components of the device, for example, to direct data of the MSI requests to be stored in a memory of the computing system, and to direct a Central Processing Unit (CPU) to process the MSI requests, according to the FIFO order. A MSI request from a peripheral component may include a request for the CPU to interrupt one or more ongoing operations of the CPU, in order to prioritize the execution of a sequence of operations related to the peripheral component. The CPU may process multiple MSI requests in the FIFO order, i.e., in the order in which the MSI requests are received and stored. The controller may manage the incoming MSI requests. For example, the controller may define a FIFO structure, e.g., a FIFO queue in the main memory of the device, to store data of the incoming MSI requests. In some embodiments, a memory size of the FIFO structure may be scalable, for example, redefined by a user, or based on predetermined criteria. Since the memory size of the FIFO structure may be significantly larger than a memory size of the host bridge, a relatively large amount of data corresponding to the MSI requests may be stored in the FIFO structure, for example, substantially all the data to be processed from a large number of incoming MSI requests.

The controller may direct data of incoming MSI requests to be stored in successive entries of the FIFO structure, according to the order of arrival of the MSI requests at the host bridge. For example, the controller may direct data of a first incoming MSI request to be stored in a first entry of the FIFO structure, and data of a second, successive incoming MSI request in a second, successive entry of the FIFO structure, and so on. To process the data of the MSI requests stored in the FIFO structure according to the FIFO order, the controller may direct the CPU to process data of the first stored MSI request, then data of the second MSI request, and so on.

In some embodiments, for example, a peripheral component may send a MSI request to the host bridge through a Peripheral Components Interconnect (PCI) or a PCI express port. The controller may receive the request and determine that the request is a MSI request by reading a sequence of bits identifying the request. The controller may include, for example, a write register to point to a current write entry in the FIFO structure, where data of an incoming MSI request is to be stored. The controller may replace the address included in the MSI request with an address of the current write entry in the FIFO structure, as pointed by the write register, thereby addressing data of the MSI request to be stored in the current write entry of the FIFO structure. Once the data of the MSI request is stored in the FIFO structure, the controller updates the address of the current write entry to point to a next sequential entry of the FIFO structure, where the next incoming MSI request is to be stored according to the FIFO order. The controller may include a base register and a size register, to contain addresses of a base entry of the FIFO structure, and of a size of the FIFO structure, respectively. Upon reaching a last entry of the FIFO structure, according to the size determined by the size register, the write register may be directed to point back to the base entry.

In some embodiments, the controller may include a read register, to point to a current read entry of the FIFO structure, where data of a pending MSI request to be currently processed by the CPU is stored. The read register thus directs the CPU to retrieve the data of the MSI request to be currently processed from the current read entry of the FIFO structure. Once the data of the MSI request to be currently processed is retrieved by the CPU, the controller updates the address of the current read entry to point to a next sequential entry of the FIFO structure, where data of the next MSI request to be processed according to the FIFO order is stored.

In some embodiments the controller may include an overrun register, to notify the controller when the FIFO structure becomes full, e.g., by determining that all entries in the FIFO structure contain data of unprocessed MSI requests, for example, by determining that the read register and the write register point to a same entry of the FIFO structure. In some embodiments, in case of an overrun, i.e., when the overrun register indicates that all entries of the FIFO structure contain data of unprocessed MSI requests, the controller may overwrite data stored in the FIFO structure in a predefined order, for example, by directing data of a new incoming MSI request to overwrite data of an oldest pending MSI request in the FIFO structure. In other embodiments, in case of overrun, the controller may generate an indication that an interrupt error has occurred.

In some embodiments, the memory of the computing device storing data of the incoming MSI requests may have a large capacity to store MSI data, and may allow the CPU to efficiently retrieve information from the FIFO structure about multiple MSI requests stored therein. In some embodiments, to avoid unnecessary interruptions in the operation of the CPU, e.g., in case of an overrun, the controller may overwrite data of an oldest pending, e.g., outdated, MSI request. In some embodiments, the controller may direct the CPU to retrieve data of MSI requests based on the order of arrival of the requests to the host bridge, thereby obviating the need for a priority algorithm to determine an order in which data of MSI requests are to be sent to the CPU. In some embodiments, the FIFO structure may include sufficient memory, to allow storing complete information, for example, all the data in one or more data fields of a large number, practically any number, of respective MSI requests. The stored data fields may be of any desired size, for example, two bytes per data field.

Figure 1:
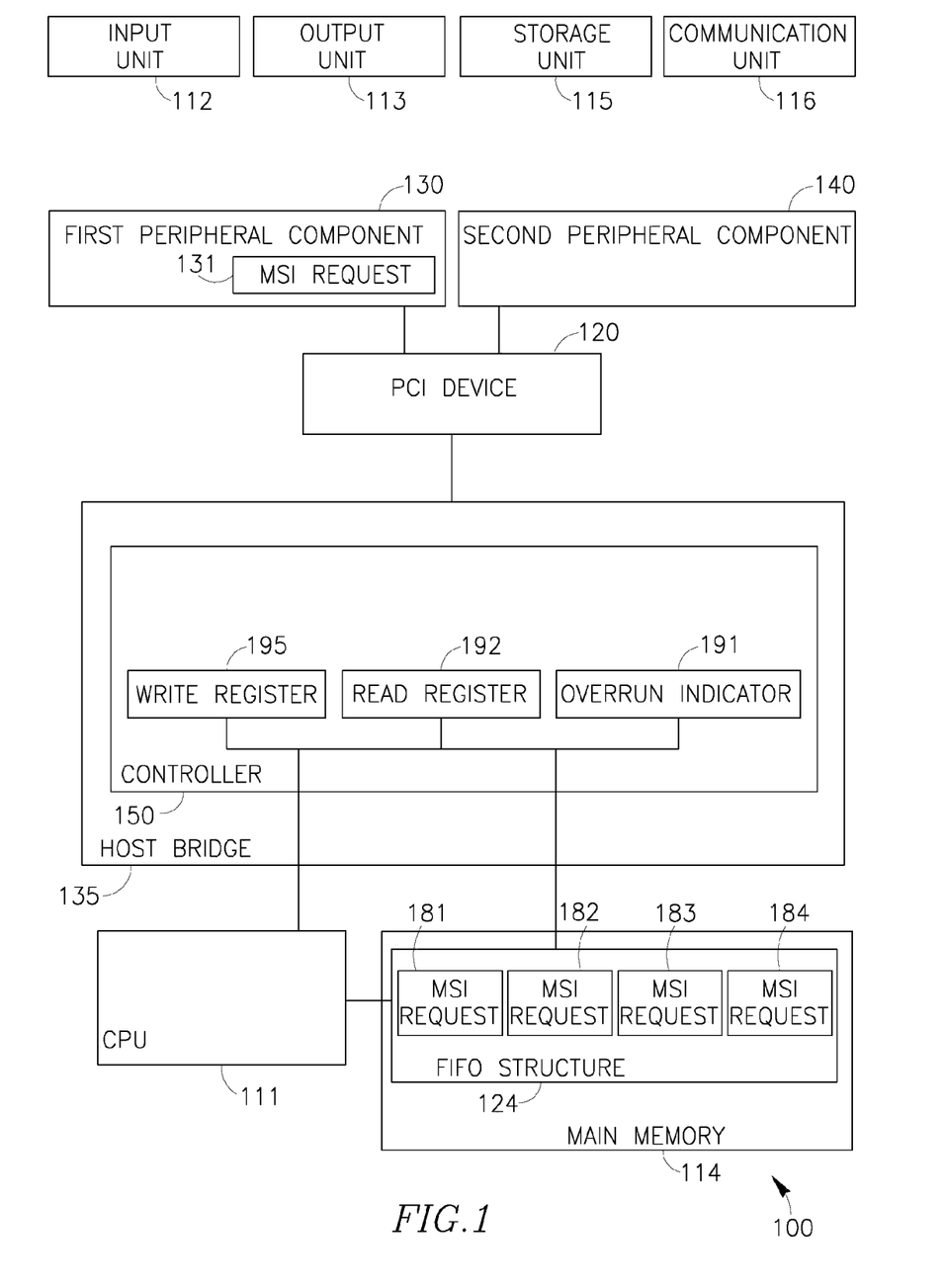
FIG. 1 is a schematic block diagram illustration of a system capable of managing MSI requests, in accordance with some demonstrative embodiments.

Reference is made to FIG. 1, which schematically illustrates a system 100 in accordance with some demonstrative embodiments.

In some embodiments, system 100 may include a host bridge 135, to manage communication between a plurality of components of system 100. For example, host bridge 135 may physically and logically connect between a Central Processing Unit (CPU) 111 and/or a main memory 114, and one or more peripheral system components, e.g., a first peripheral component 130 and a second peripheral component 140. In some embodiments, host bridge 135 may be may be manufactured as a stand-alone chip. In other embodiments, host bridge 135 may be manufactured as an integral part of a motherboard of system 100, together with other components of system 100. In some demonstrative embodiments, main memory 114 includes, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or any other memory type, and may be a single memory unit or any combination of suitable memory units or storage units. CPU 111 may include, for example, a digital signal processor (DSP), a microprocessor, a host processor, a controller, a plurality of processors or controllers, a chip, a microchip, one or more circuits, circuitry, a logic unit, an integrated circuit (IC), an application-specific IC (ASIC), or any other suitable multi-purpose or specific processor or controller.

Peripheral components 130 and/or 140 may include, for example, hardware externally connected to system 100, removable media, portable media, Input/Output (I/O) devices including, for example, storage, networking, hardware accelerators, and/or any other PCI or PCIe attached hardware, a sound card, a graphics card, a Compact Disc (CD), a CD ROM, a Digital Versatile Disc (DVD), a DVD ROM, a DVD RAM, a Universal Serial Bus (USB), input devices, output devices, a printer, a Webcam, display devices, a modem, a network card, or the like.

In some embodiments, a peripheral component, e.g., first peripheral component 130, may send a first Message Signaled Interrupt (MSI) request 131 to the host bridge 135. MSI request 131 may include, for example, a request for CPU 111 to interrupt one or more ongoing operations, in order to prioritize the execution of a sequence of operations related to first peripheral component 130, e.g., to start or stop reading and/or writing data associated with first peripheral component 130, to store data of first peripheral component 130 in main memory 114, or other requests. Although not limited in this respect, some embodiments may include a Peripheral Component Interconnect (PCI) device 120 to route MSI requests from peripheral components of system 100, e.g., to transfer MSI request 131 from first peripheral component 130 to host bridge 135. PCI device 120 may include a bus, a plurality of lanes, or any suitable structure hardware and/or software. Other embodiments may include different communication configurations and/or protocols. For example, in some embodiments, the MSI requests may be routed by a PCI express (PCIe) device, which may include a computer extension card, a plurality of lanes, a set of switches, or any other suitable hardware and/or software components.

In some embodiments, host bridge 135 may include a controller 150 to receive incoming MSI requests, and to control the storage and processing of data included in the MSI requests, as described in detail below with reference to FIG. 2. Controller 150 may define a First In First Out (FIFO) structure 124 in main memory 114 to store data of one or more MSI requests, e.g., MSI requests 181-184. FIFO structure 124 may store one or more data fields and other data of the incoming MSI requests, for example, substantially all the data included in a data field of given size (e.g., two-bytes) of the incoming MSI requests. FIFO structure 124 may include a plurality of entries representing a plurality of respective memory locations in main memory 114, to store data of MSI requests, e.g., MSI requests 181-184, according to a FIFO order, as described below. Controller 150 may direct to store data of a first incoming MSI in a first entry of FIFO structure 124, data of a second, successive incoming MSI in a second, next entry of the FIFO structure 124, and so on. Controller 150 may send an interrupt request to CPU 111 when an incoming MSI is received, and may direct CPU 111 to retrieve from FIFO structure 124 data of one or more MSI requests to be processed, according to the FIFO order.

For example, controller 150 may first receive MSI request 181, then MSI request 182, then MSI request 183, and then MSI request 184 from one or more peripheral components of system 100, e.g., from first peripheral component 130 and/or from second peripheral component 140. Controller 150 may direct to store data of MSI request 181 in a first entry of the FIFO structure 124, to store data of MSI request 182 in a second entry of the FIFO structure 124, to store data of MSI request 183 in a third entry of the FIFO structure 124, and to store data of MSI request 184 in a fourth entry of the FIFO structure 124, wherein the first, second, third and fourth entries are sequential entries of FIFO structure 124. Controller 150 may direct CPU 111 to process data of MSI requests 181-184, stored in FIFO structure 124, according to the FIFO order, e.g., to first retrieve and process data of MSI request 181, then to retrieve and process data of MSI request 182, then to retrieve and process data of MSI request 183, and then to retrieve and process data of MSI request 184.

In some embodiments, controller 150 may include a plurality of registers, for example, a read register 192 and a write register 195, to point to entries of FIFO structure 124, as described below. Controller 150 may additionally include an overrun indicator 191, to generate an indication when an overrun occurs, e.g., as described below with reference to FIG. 2. Read register 192 may point to a current read entry of FIFO structure 124, where data of a next pending MSI request to be processed by CPU 111 is stored. After CPU 111 retrieves data of each MSI request to be processed, controller 150 updates read register 192 to point to the next, immediately following, entry of FIFO structure 124. In some embodiments, write register 195 may point to a current write entry in FIFO structure 124 where a current incoming MSI request is to be stored. In some embodiments, after each incoming MSI request is stored in FIFO structure 124, controller 150 updates write register 192 to point to a next, immediately following, entry of FIFO structure 124, where data of the next incoming MSI request is to be stored. In some embodiments, overrun indicator 191 may generate an indication when all entries of FIFO structure 124 contain data of pending MSI requests that have not yet been processed by CPU 111. An overrun may be detected, for example, by determining that read register 192 and write register 195 point to the memory address of the same entry of the FIFO structure, as described below with reference to FIG. 2.

System 100 may include, for example, an input unit 112, an output unit 113, and a storage unit 115. System 100 may optionally include other suitable hardware components and/or software components.

Input unit 112 includes, for example, a keyboard, a keypad, a mouse, a touch-pad, a track-ball, a stylus, a microphone, or other suitable pointing device or input device. Output unit 113 includes, for example, a monitor, a screen, a Cathode Ray Tube (CRT) display unit, a Liquid Crystal Display (LCD) display unit, a plasma display unit, one or more audio speakers or earphones, or other suitable output devices.

In some embodiments, components of system 100 may be enclosed in a common housing or packaging, and may be interconnected or operably associated using one or more wired or wireless links. In other embodiments, components of system 100 may be distributed among multiple or separate devices or locations, may be implemented using a client/server configuration or system, or may communicate using remote access methods.

Figure 2:
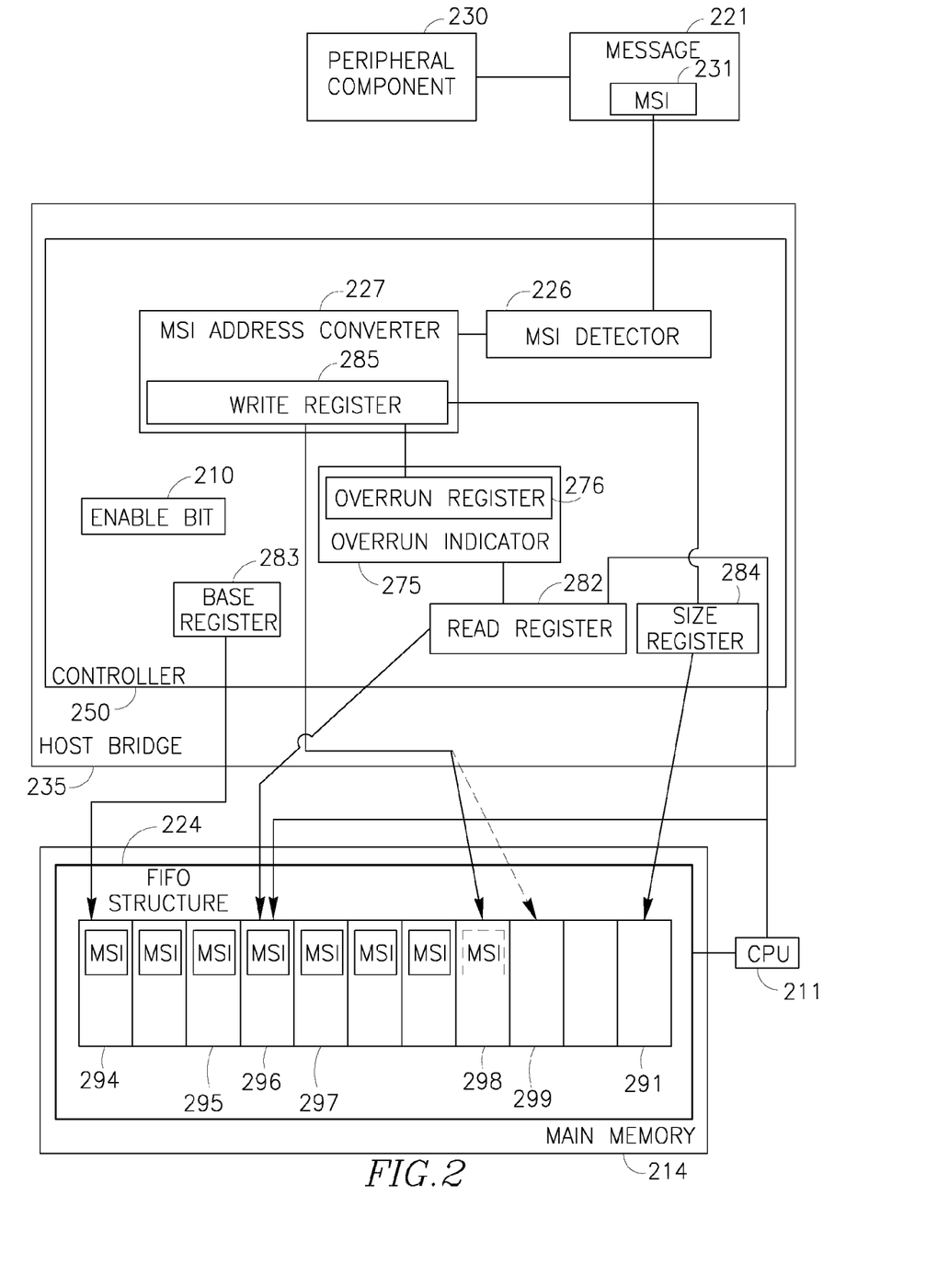
FIG. 2 is a schematic block diagram illustration of a host bridge associated with multiple components of a computing system in accordance with some demonstrative embodiments.

Reference is made to FIG. 2, which schematically illustrates a block diagram of a host bridge 235 associated with multiple components of a computing system, in accordance with some demonstrative embodiments. In some non limiting embodiments, one or more elements illustrated in FIG. 2 may perform the functionalities of one or more respective elements of system 100.

In some embodiments, a peripheral component 230 may send a message 221 to be processed by a CPU 211. Message 221 may include, or may be, a MSI request 231, sent to host bridge 235, to notify CPU 211 to interrupt ongoing operations of CPU 211 in order to prioritize the execution of a sequence of operations related to the peripheral component 230, e.g., as described above with reference to first MSI request 131 (FIG. 1).

In some embodiments host bridge 235 may manage communication between a plurality of components of system 200. In some non limiting embodiments, host bridge 235 may perform the functionalities of host bridge 135 (FIG. 1). Host bridge 235 may be associated with, or may include a controller 250, to manage and control one or more incoming MSI requests sent to host bridge 235. In some non limiting embodiments, controller 250 may perform the functionalities of controller 150 (FIG. 1).

In some embodiments, host bridge 235 may include an enable bit 210, to activate controller 250, i.e., to command controller 250 to perform a pre-defined sequence of operations when an incoming MSI request is received, e.g., as described below. Enable bit 210 may be set or reset, for example, manually by a user, or automatically based on pre-determined criteria, as described below.

In some embodiments, controller 250 may include a MSI detector 226, to detect whether or not an incoming message is a MSI request, based on data included in the message. For example, MSI detector 226 may receive message 221, and may read one or more data strings of message 221 that are associated with an address of message 221. MSI detector 226 may include a list of addresses of messages associated with MSI requests, and may check whether or not the one or more data strings of the message 221 correspond to an address from the list.

In some embodiments, if message 221 includes a MSI request, e.g., MSI request 231, MSI detector 226 may send MSI request 231 to a MSI address converter 227, which may replace the address of MSI 231 with an address of a current write entry of a FIFO structure 224, that may perform substantially the same functionalities as FIFO structure 124 (FIG. 1). For example, MSI address converter 227 may replace the one or more data strings associated with the address of MSI request 231 with data representing a new address, or memory location, e.g., an address of a current write entry 298 of FIFO structure 224. In some non limiting embodiments, the address of current write entry 298 may be stored in a write register 285, that may perform substantially the same functionalities as write register 195 (FIG. 1). Entry 298 may be a next, sequential, entry of FIFO structure 224, immediately following an entry containing data of a latest incoming MSI request.

In some embodiments, MSI converter 227 may send MSI request 231 to be stored in current write entry 298 of FIFO structure 214, as pointed by write register 285. After data of MSI request 231 is stored, controller 250 may update write register 285 to point to an entry 299, which is the next, immediately following entry. Thus, controller 250 directs a sequence of MSI requests to be stored sequentially in successive entries of FIFO structure 224. When the last entry 291 of FIFO structure 224 is reached, according to the FIFO order, controller 250 may update write register 285 to point back to an address of a first entry 294 of FIFO structure 224, for example, the address stored in base register 283. In some non limiting embodiments, for example, an entry of FIFO structure 224 may have a typical size of sixteen kilobytes.

Controller 250 may include a read register 282 to point to a current read entry 296 of FIFO structure 224. Current read entry 296 contains data of a MSI to be processed by processed by CPU 211 according to the FIFO order. CPU 211 may use the address as pointed by read register 282, and may accordingly retrieve for processing data of the MSI stored in current read entry 296. Controller 250 may dynamically update the address stored in read register 282, after each pending MSI request is retrieved for processing, to point to a next sequential entry of the FIFO structure. For example, after CPU 211 retrieves data of the MSI request contained in current read entry 296 for processing, controller 250 may update read register 282 to point to an entry 297, which is the next, immediately following entry of FIFO structure 224, and thus entry 297 becomes the current read entry of FIFO structure 224, etc., thus directing CPU 211 to retrieve the MSI requests for processing according to the FIFO order in which they were stored in FIFO structure 224.

In some embodiments, controller 250 may include an overrun indicator 275, to generate an overrun indication, e.g., to a user, indicate when there is an overrun, e.g., when substantially all entries in the FIFO structure 224 store MSI requests that have not been processed by CPU 211. For example, overrun indicator 275 may include an overrun register 276 to compare between the addresses stored in read register 282 and write register 285, and thus to detect when register 282 and write register 285 point to the same address in FIFO structure 224.

In some embodiments, when an overrun occurs, controller 250 may continue to update register 285 to point to the next entry of FIFO structure 224, and may thereby direct data of new, incoming MSI request to overwrite data of entries containing pending MSI requests in FIFO structure 224. This may be done by disabling enable bit 210 and updating write register 285 to point back to a base entry 294, thus resetting the FIFO order. Enable bit 210 may then be re-enabled, thereby resuming the above-described sequence of operations of controller 250.

In other embodiments, controller 250 may dynamically size and resize FIFO structure 224, for example, may dynamically add entries to, or remove entries from, FIFO structure 224, e.g., according to the value stored in size register 284.

Thus, FIFO structure 224 may include a number of entries sufficient to store data of any desired number of pending MSI requests.

Figure 3:
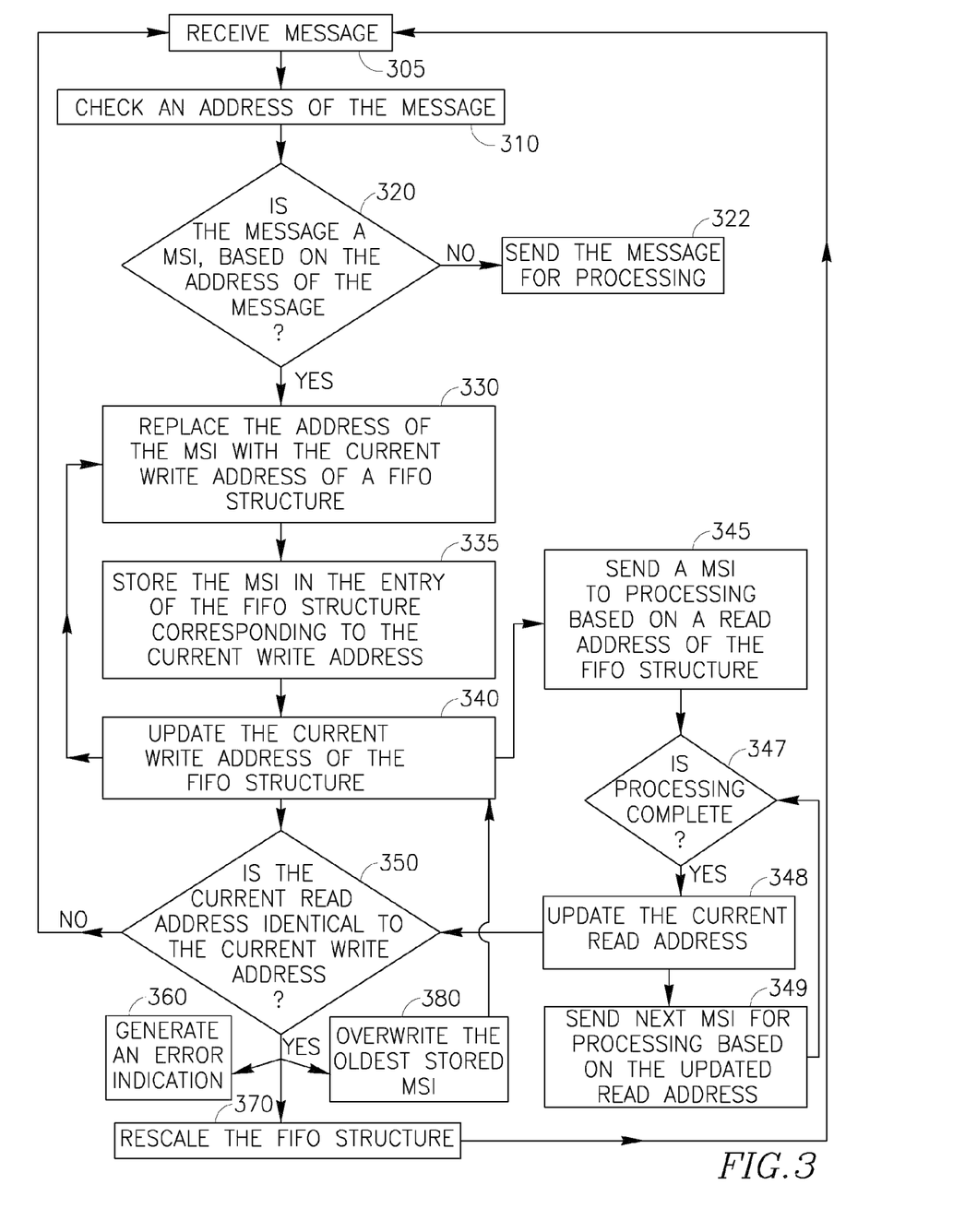
FIG. 3 is a schematic flow-chart illustration of a method of managing MSI requests, in accordance with demonstrative embodiments.

Reference is made to FIG. 3, which schematically illustrates a method of controlling MSI requests, in accordance with demonstrative embodiments. In some non-limiting embodiments, one or more operations of the method of FIG. 3 may be included in, or implemented by, for example, one or more elements of a system, e.g., system 100 (FIG. 1), and/or by controller 250 (FIG. 2), and/or by other suitable methods, units, devices and/or systems.

As indicated at block 305, in some embodiments the method may include, for example, receiving a message, e.g., a MSI request to be processed.

As indicated at block 310, in some embodiments the method may include checking an address of the message, for example, by reading one or more data strings of the message, e.g., an address field of the message.

As indicated at block 320, in some embodiments the method may include determining whether or not the message is a MSI request, for example, by checking whether or not the one or more data strings of the message correspond to an address associated with MSI requests.

As indicated at block 322, if the message is not a MSI request, the method may include sending the message directly for processing.

As indicated at block 330, the method may include replacing the address of the MSI request with the address of a current write entry of a FIFO structure defined in a main memory of the computing system, for example, FIFO structure 114 of system 100 (FIG. 1). This may be performed, for example, by replacing the one or more data strings of the message with a new data string representing the address of the current write entry in the FIFO structure.

As indicated at block 335, in some embodiments the method may include storing data of the MSI request in the current write entry of the FIFO structure. This may be performed, for example, by reading the replaced address of the MSI, and directing the MSI request to the current write entry of the FIFO structure, for example, current write entry 298 (FIG. 2).

As indicated at block 340, in some embodiments the method may include updating the current write address within the FIFO structure, for example, pointing to the address of a next sequential entry following the current write entry of the FIFO structure, e.g., entry 299 (FIG. 2).

As indicated at block 345, the method may include retrieving data of a pending MSI request for processing from a current read entry of the FIFO structure. The current read entry, e.g., current read entry 296 (FIG. 2), which may contain data of an oldest pending MSI request.

As indicated at block 347, in some embodiments, the method may include determining whether processing of the MSI is complete.

As indicated at block 348, in some embodiments the method may include, after completion of processing of the MSI request, updating the address of the current read address of the FIFO structure, for example, by pointing to the next sequential address of the FIFO structure, e.g., entry 297 (FIG. 2).

As indicated at block 349, in some embodiments the method may include retrieving data of a next pending MSI request for processing from the updated address of the current read entry.

As indicated at block 350, in some embodiments the method may include detecting whether or not all the entries of the FIFO structure contain pending MSI requests by checking whether the address of the current read address is identical to the address of the current write entry, for example, by comparing stored values corresponding to the addresses of the current read and write entries.

As indicated at block 360, in some embodiments the method may include generating an error indication if the FIFO structure is full, i.e., if the current read and write addresses are identical. This may include, for example, generating a runtime notification error to a user.

As indicated at block 370, in other embodiments the method may include resizing the FIFO structure, for example, by increasing or decreasing the number of entries of the FIFO structure, to store data from a desired number of incoming MSI requests.

As indicated at block 380, in yet other embodiments the method may include overwriting data of existing MSI requests with data of new, incoming MSI requests, for example, by directing data of a new incoming MSI request to be stored in an entry of the FIFO structure where a longest pending MSI requests is stored.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of managing Message Signaled Interrupt (MSI) requests in a computing system, the method comprising:
   receiving a plurality of MSI requests from one or more components of the computing system;
   directing data of said plurality of MSI requests to be stored sequentially, according to a First In First Out (FIFO) order, in successive entries of a FIFO structure defined in a main memory of said computing system;
   directing a processor of said computing system to retrieve data of one or more of said plurality of MSI requests from said FIFO structure to be processed according to said FIFO order;
   upon receiving a new MSI request, determining whether or not all entries of said FIFO structure contain data of unprocessed MSI requests; and
   if all entries of said FIFO structure contain data of unprocessed MSI requests, sending an error indication, resizing said FIFO structure to add an additional entry for said new MSI request, or overwriting with said new MSI request an existing entry of said FIFO structure that contains data of an oldest pending unprocessed MSI request.

2. The method of claim 1, comprising:
   defining said FIFO structure in said main memory by allocating one or more memory locations of said main memory to store one or more, respective, entries of said FIFO structure.

3. The method of claim 1, comprising:
   directing substantially all the data of a data field of said plurality of MSI requests to be stored in respective entries of said FIFO structure.

4. The method of claim 1, further comprising:
   dynamically resizing said FIFO structure in accordance with the contents of a size register.

5. The method of claim 1, wherein overwriting an existing entry of said FIFO structure with said new MSI request comprises updating a write register to point back to a first entry of said FIFO structure.

6. The method of claim 1, wherein directing data of said plurality of MSI requests comprises pointing to a current write entry of said FIFO structure in which data of a current MSI request is to be stored according to said FIFO order.

7. The method of claim 6, further comprising:
   updating said pointing to point to a next entry of said FIFO structure according to said FIFO order.

8. The method of claim 1, wherein directing the processor of said computing system comprises pointing to a current read entry of said FIFO structure from which data is to be retrieved by said processor according to said FIFO order.

9. The method of claim 8, further comprising:
   updating said pointing to point to a next entry of said FIFO structure according to said FIFO order.

10. An apparatus for managing Message Signaled Interrupt (MSI) requests in a computing system, the apparatus comprising:
    a controller to direct data of a plurality of MSI requests received from one or more components of said computing system to be stored in successive entries of a First In First Out (FIFO) structure defined in a main memory of said computing system, wherein said controller comprises:
    a write register to point to successive entries of said FIFO structure in which data of said MSI requests is to be stored according to a FIFO order;
    a read register to point to one or more of the successive entries of said FIFO structure from which one or more of said MSI requests, respectively, are to be retrieved for processing according to said FIFO order; and
    wherein upon receiving a new MSI request said controller is operative to determine whether or not all entries of said FIFO structure contain data of unprocessed MSI requests, and if all entries of said FIFO structure contain data of unprocessed MSI requests, said controller is operative to send an error indication, resize said FIFO structure to add an additional entry for said new MSI request, or overwrite with said new MSI request an existing entry of said FIFO structure that contains data of an oldest pending unprocessed MSI request.

11. The apparatus of claim 10, wherein said controller comprises:
   a base register to store data pointing to a memory location allocated to a base entry of said FIFO structure; and
   a size register to store data pointing to a memory location corresponding to a last entry of said FIFO structure.

12. The apparatus of claim 10, wherein said controller is to update said write register to point to a next entry of said FIFO structure according to said FIFO order, after directing data of each of said MSI requests to be stored in said FIFO structure.

13. The apparatus of claim 10, wherein said controller is to update said read register to point to a next entry of said FIFO structure, according to said FIFO order, after directing said processor to retrieve data of each of said MSI requests to be processed in said FIFO order.

14. The apparatus of claim 10, comprising an overrun register to determine whether or not all entries of said FIFO structure contain data of unprocessed MSI requests, by determining whether or not said write register and said read register point to a same entry of said FIFO structure.

15. The apparatus of claim 10, wherein said controller is operative to dynamically resize said FIFO structure in accordance with the contents of a size register.

16. The apparatus of claim 10, wherein said controller is operative to overwrite an existing entry of said FIFO structure with said new MSI request by updating said write register to point back to a first entry of said FIFO structure.

17. The apparatus of claim 10, wherein said controller is to direct substantially all data of one or more data fields of said plurality of MSI requests to be stored in respective entries of said FIFO structure.

18. A computing system capable of managing Message Signaled Interrupt (MSI) requests, the system comprising:
   a processor;
   a main memory;
   a controller to direct data of a plurality of MSI requests received from one or more components of the computing system to be stored sequentially, according to a First In First Out (FIFO) order, in successive entries of a FIFO structure defined in said main memory, and to direct said processor to retrieve one or more of the MSI requests stored in said FIFO structure for processing according to said FIFO order; and
   wherein upon receiving a new MSI request said controller is operative to determine whether or not all entries of said FIFO structure contain data of unprocessed MSI requests, and if all entries of said FIFO structure contain data of unprocessed MSI requests, said controller is operative to send an error indication, resize said FIFO structure to add an additional entry for said new MSI request, or overwrite with said new MSI request an existing entry of said FIFO structure that contains data of an oldest pending unprocessed MSI request.

19. The system of claim 18, comprising:
   a write register to point to a current write entry of said FIFO structure in which data of a current MSI of said plurality of MSI requests is to be stored according to said FIFO order; and
   a read register to point to a current read entry of said FIFO structure from which data of a pending MSI request is to be retrieved and processed by said processor according to said FIFO order.

20. The system of claim 18, wherein said controller is operative to dynamically define a size of said FIFO structure to include a desired number of entries by allocating a suitable amount of memory in said main memory for storing said desired number of entries of said FIFO structure.

* * * * *